United States Patent [19]

Dudgeon et al.

[11] Patent Number: 4,493,912

[45] Date of Patent: Jan. 15, 1985

[54] ELECTROMAGNETIC WAVE ATTENUATING COMPOSITION

[75] Inventors: Charles D. Dudgeon, Clifton Park, N.Y.; Maynard R. Winstead, Peabody, Mass.

[73] Assignee: General Electric Company, Schenectady, N.Y.

[21] Appl. No.: 523,306

[22] Filed: Aug. 15, 1983

[51] Int. Cl.$^3$ .......... C09D 5/32; C09D 3/72; C09D 3/80

[52] U.S. Cl. .......... 523/137; 106/1.05; 252/513; 428/423.1; 428/500; 524/439; 524/440; 524/441; 524/556; 524/562; 524/591

[58] Field of Search .......... 523/137; 252/513; 106/1.05; 524/591, 556, 562, 440, 441, 439; 428/423.1, 500

[56] References Cited

U.S. PATENT DOCUMENTS

| | | | |
|---|---|---|---|
| 2,280,135 | 4/1942 | Ward | 524/440 |
| 2,718,506 | 9/1955 | Elleman | 523/137 |
| 3,406,105 | 10/1968 | Letendre | 252/513 |
| 3,919,145 | 11/1975 | Eckhoff | 106/34 |
| 4,116,906 | 9/1978 | Ishino et al. | 523/137 |
| 4,155,896 | 5/1979 | Rennier et al. | 252/513 |

FOREIGN PATENT DOCUMENTS

| | | | |
|---|---|---|---|
| 0038679 | 10/1981 | European Pat. Off. | 252/513 |
| 54-127000 | 10/1979 | Japan | 523/137 |
| 57-80461 | 5/1982 | Japan | 523/137 |

*Primary Examiner*—Ronald W. Griffin
*Attorney, Agent, or Firm*—Donald J. Voss

[57] ABSTRACT

A method of preparing a novel electromagnetic wave attenuating composition comprising forming a curable film forming coating composition and thereafter dispersing an effective amount of an electrically conductive additive in said curable film forming composition under low shear conditions to form said electromagnetic wave blocking composition.

12 Claims, No Drawings

ELECTROMAGNETIC WAVE ATTENUATING COMPOSITION

BACKGROUND OF THE INVENTION

Electromagnetic wave interference (EMI) or radio frequency interference (RFI) results from the operation of various electronic devices. Many devices such as electronic memories are extremely sensitive to EMI or RFI pollution which can deprogram memories and has the potential for ruining the circuitry and thus rendering the device useless. Historically this was not a problem to industry because of metallic housings that acted as a shield and the fact that sensitive electronic devices were not in wide use. The use of plastics in place of metal for the manufacture of housings for electronic devices results in a structure that allows electromagnetic waves to flow virtually unimpeded through the device. The Federal Communications Commission has established regulations to limit the amount of electromagnetic radiation that may be emitted by an electronic device (FCC Docket No. 20780). This regulation divides computing devices into two broad categories of those intended for business (Class A) and those for home use (Class B). The limits are defined by an electromagnetic wave having a given field strength or less at a given distance throughout a given frequency range. The industry has met the standard imposed by the FCC regulations by using vacuum metalizing or silver filled paints which are quite costly.

Other industry standards for these products are VDE German standard 0871/6.78; the proposed SAE AIR 1499; and U.S. Department of Health MDS-201-004.

Many solvent based coatings have been used for this reason and they have included electrically conductive additives such as nickel, copper and silver. The term plastic is used to refer to those polymeric materials commonly used for housing for electronic apparatus such as polyphenylene ethers, polycarbonates, polyacrylates, polysulfones, polystyrenes, flame retardant polystyrenes, epoxy resins and the like.

The applicants have discovered a method for making a coating composition containing electrically conductive powder that results in a coating composition that adheres to plastic substrates and is capable of shielding sensitive electronic components from electromagnetic radiation.

Thus, the primary object of the present invention is to provide a composition that is capable of blocking electromagnetic radiation and also a coating composition that adheres to and does not cause the plastic substrates to become damaged by solvents.

DETAILED DESCRIPTION OF THE INVENTION

The invention provides a method of preparing a novel electromagnetic wave attenuating composition. The method comprises:

(a) forming a curable film forming coating composition; and
(b) thereafter dispersing an effective amount of an electrically conductive additive in said curable film forming composition under low shear conditions to form said electromagnetic wave blocking composition.

The nature of the curable film forming composition is not critical, although it is necessary to select materials which are capable of fully wetting the conductive powder compositions so that an adherent coating having fully dispersed conductive powder is obtained. Water based systems are preferred. In this regard, it is preferred to utilize an amount of a suitable wetting agent which may be an anionic surfactant as an additive to the composition.

Suitable curable film forming coating compositions include aqueous dispersions of acrylic and urethane resins. These aqueous compositions may include surface active agents to insure that the conductive flakes or powders are completely "wetted". The acrylic based curable film forming compositions may include carboxylated acrylic resins such as styrene-acrylic copolymers (Neocryl A-621 from Polyvinyl Chemical Co. of Wilmington, Mass.) or other commercially available acrylics such as Rhoplex WL-91 (Rohm & Haas, Philadelphia, Pa.) Ucar 4431 (Union Carbide Co., New York, N.Y.) or Stacryl 200 (Stanley Chemicals Co.). The urethane resins include the aqueous aliphatic urethane that may be prepared using procedures that are described in the Encylopedia of Polymer Science and Technology, Vol. II, pp. 555–558. Briefly, these materials are prepared by reaction of a diisocyanate with a polyol or water. Suitable diisocyanates are of the formula OCN—R—NCO when R is an organic radical. Suitable R groups include $(CH_2)n$, wherein n is an integer of from 1 to 8. Specific examples of the diisocyanates include hexamethylene diisocyanate; methylcyclohexene diisocyanate; lysine diisocyanate; bis(2-isocyanatoethyl)-fumarate and bis(2-isocyanatoethyl) carbonate.

A preferred aliphatic urethane is Neorez R-963 which is available from Polyvinyl Chemical Industries, 730 Main Street, Wilmington, Mass. 01887.

If an anionic surfactant is employed, the particular anionic surfactant is not critical to the invention and various materials such as sodium lauryl sulfate, sodium alkyl sulfonates, alkyl aryl sulfonates, sodium 2,2-dinaphthyl-methane-6,6'-disulfonate and the like may be used. Other anionic surfactants are listed in McCutcheon's Detergents and Emulsifiers; 1979 Edition which is incorporated by reference.

To impart resistance to polar solvents such as methanol, an additive to the urethane base composition may be utilized which is a trifunctional aziridine compound, which is a derivative of ethyleneimine, having the formula:

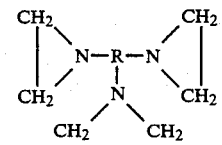

wherein R is a trivalent radical which is proprietary to Cordoba Chemical Company, Sacramento, Calif.; however, the product is available commercially from that company under the designation XAMA-7.

The electrically conductive additive may include nickel, copper, iron, silver, chromium, tin, aluminum, zinc or carbon materials which possess the morphology which permits the formation of an electrically conductive layer when from 10–60 volume percent of the additive is dispersed in a curable film forming coating composition. The preferred additive is nickel in the form of powder. The term electrically conductive is used to define a film surface resistivity of less than about 75 ohms/square according to a test that is described hereinafter. The preferred ranges of electrical conductivity are between 50 and 0.05 ohms/square and especially preferred are conductivities 0.1 to 0.7 ohm/square. The electrical conductivity may be correlated with the surface characteristics that are necessary to block electromagnetic radiation and it is a useful test to determine the suitability of a given composition for electromagnetic wave attenuation.

The compositions of the invention preferably include from about 40 to 80 parts by weight of a 20-40% by weight dispersion of the curable film forming compositions and from about 20 to 60 parts by weight of the electrical conductive additive. The trifunctional aziridine may be added at from 0.5 to 5 parts by weight of composition, if desired and if a surfactant is present, it may comprise from 10-20 parts by weight of a 20-50% solids aqueous dispersion of the surfactant.

The manner in which the compositions of the invention are prepared as well as the morphology of the electrically conductive additive are very important to the production of a coating which can successfully attenuate electromagnetic radiation. The use of a high shear mixing apparatus should be avoided when the electrically conductive additive is dispersed in the curable film forming compositions. The use of a high shear apparatus tends to break down the particle size of electrically conductive additives thus reducing the degree of overlap and tangential contact between particles of the additive and the resultant loss of electrical conductivity. The use of a low shear mixing procedure avoids the breakdown of the electrically conductive particles and the proper type of a low shear mixing step can be selected based on the degree of shear which produces a coating having the proper degree of electrical conductivity and electromagnetic attenuation.

The curing conditions for the composition will depend on the nature of the curable film forming compositions. The preferred compositions are aqueous based materials that may be air dried at ambient conditions. If desired, heat e.g. of 72°-150° F. may be used to accelerate the cure of these film forming compositions.

The term ohm/square is a unitless term that is based on a test which measures the resistance between two silver clad dimes that are placed apart on the test surface at a distance equal to the diameter of a dime. A Simpson meter is then used to determine the resistance.

When nickel powder is used as the electrical conductive additive it is preferred that the powder used has a chain-like structure. This structure makes the powder fluffy in nature with low apparent density and large specific surface area. Such a powder is available from International Nickel Company as INCO type 255. This powder has an average particle size of from about 2.2 to about 2.8 microns, an apparent density of from about 0.5 to about 0.65 g/cc and a specific surface area of about 0.68 m²/g.

DESCRIPTION OF THE PREFERRED EMBODIMENT

EXAMPLE 1

|  |  | 1A | 1B | 1C |
|---|---|---|---|---|
| Neocryl A-621 | (1) | 24.40% | 24.40% | 24.40% |
| Tamol 165 | (2) | 12.00% | 12.00% | 12.00% |
| Water |  | 14.27% | 14.27% | 14.27% |
| Nickel Flake | (3) | 49.33% | — | — |
| Nickel Powder | (4) | — | 49.33% | — |
| Nickel Powder | (5) | — | — | 49.33% |

(1) 60% aqueous solution of a styrene acrylic copolymer available from Polyvinyl Chemical.
(2) 21% aqueous solution of an ammonium salt available from Rohm & Haas.
(3) HCA from Novamet.
(4) INCO Type 123, available from the International Nickel Company.
(5) INCO Type 255, available from the International Nickel Company.

All three were sprayed onto foam Noryl FN-215 to give a dry film thickness of approximately two mils. Surface resistivity, as measured by the three dime method was:

1A 0.6 ohms/sq.
1B 1.1 ohms/sq.
1C 0.05 ohms/sq.

EXAMPLE 2

|  |  | 2A | 2B | 2C | 2D | 2E |
|---|---|---|---|---|---|---|
| Spencol L-55 | (1) | 43.7% | 43.7% | 55.9% | 50.0% | 66.7% |
| Water |  | 10.0% | 10.0% | 12.8% | — | — |
| Nickel Flake | (2) | 43.7% | — | — | 50.0% | — |
| Nickel Powder | (3) | — | 43.7% | 28.0% | — | 33.3% |
| Xama-7 | (4) | 2.6% | 2.6% | 3.3% | — | — |

(1) 30% aqueous solution of a urethane resin, available from Spencer-Kellogg.
(2) HCT from Novamet.
(3) INCO Type 255
(4) Trifunctional aziridine, available from Cordoba Chemical.

All five were sprayed onto foam Noryl FN-215 to give a dry film thickness of approximately 2 mils. The coated substrate was aged in a humidity cabinet at 140° F. and 95% relative humidity for 13 days and the change in surface resistivity measured.

|  | Surface Resistivity (ohms/sq) | |
|---|---|---|
|  | Initial | Final |
| 2A | 0.4 | >2000 |
| 2B | 0.2 | 3.0 |
| 2C | 0.5 | 8.0 |
| 2D | 0.4 | >4000 |
| 2E | 0.6 | 30 |

EXAMPLE 3

| Neocryl A-621 | 41.95% |
|---|---|
| INCO Type 255 Nickel | 27.92% |
| Water | 26.85% |
| Xama-7 | 3.29% |

EXAMPLE 4

| Neocryl A-622 (1) | 52.44% |
|---|---|
| INCO Type 255 Nickel | 27.92% |
| Water | 16.36% |
| Xama-7 | 3.29% |

(1) 32% aqueous solution of an acrylic resin, available from Polyvinyl Chemical.

EXAMPLE 5

| Neocryl A-640 (1) | 41.95% |
|---|---|
| INCO Type 255 Nickel | 27.92% |
| Water | 26.85% |
| Xama-7 | 3.29% |

(1) 40% aqueous solution of an acrylic resin, available from Polyvinyl Chemical.

EXAMPLE 6

| Neocryl A-655 (1) | 37.29% |
|---|---|
| INCO Type 255 Nickel | 27.92% |
| Water | 31.51% |
| Xama-7 | 3.29% |

(1) 45% aqueous solution of an acrylic resin, available from Polyvinyl Chemical.

EXAMPLE 7

| EX-856 (1) | 50.85% |
|---|---|
| INCO Type 255 Nickel | 27.92% |
| Water | 17.95% |
| Xama-7 | 3.29% |

(1) 33% aqueous solution of an acrylic resin, available from Polyvinyl Chemical.

EXAMPLE 8

| EXP-103 (1) | 50.85% |

| | |
|---|---|
| INCO Type 255 Nickel | 27.92% |
| Water | 17.95% |
| Xama-7 | 3.29% |

(1) 33% aqueous solution of an acrylic urethane resin, available from Polyvinyl Chemical.

EXAMPLE 9

| | |
|---|---|
| R-960 (1) | 50.85% |
| INCO Type 255 Nickel | 27.92% |
| Water | 17.95% |
| Xama-7 | 3.29% |

(1) 33% aqueous solution of a urethane resin, available from Polyvinyl Chemical.

EXAMPLE 10

| | |
|---|---|
| R-962 (1) | 49.35% |
| INCO Type 255 Nickel | 27.92% |
| Water | 19.45% |
| Xama-7 | 3.29% |

(1) 34% aqueous solution of a urethane resin, available from Polyvinyl Chemical.

EXAMPLE 11

| | |
|---|---|
| R-943 (1) | 62.15% |
| INCO Type 255 Nickel | 27.92% |
| Water | 6.65% |
| Xama-7 | 3.29% |

(1) 27% aqueous solution of a urethane resin, available from Polyvinyl Chemical.

EXAMPLE 12

| | |
|---|---|
| R-963 (1) | 50.85% |
| INCO Type 255 Nickel | 27.92% |
| Water | 17.95% |
| Xama-7 | 3.29% |

(1) 33% aqueous solution of a urethane resin, available from Polyvinyl Chemical.

EXAMPLE 13

| | |
|---|---|
| L-52 (1) | 55.94% |
| INCO Type 255 Nickel | 27.92% |
| Water | 12.86% |
| Xama-7 | 3.29% |

(1) 30% aqueous solution of a urethane resin, available from Spencer-Kellogg.

EXAMPLE 14

| | |
|---|---|
| L-53 (1) | 55.94% |
| INCO Type 255 Nickel | 27.92% |
| Water | 12.86% |
| Xama-7 | 3.29% |

(1) 30% aqueous solution of a urethane resin, available from Spencer-Kellogg.

EXAMPLE 15

| | |
|---|---|
| L-54 (1) | 55.94% |
| INCO Type 255 Nickel | 27.92% |
| Water | 12.86% |
| Xama-7 | 3.29% |

(1) 30% aqueous solution of a urethane resin, available from Spencer-Kellogg.

EXAMPLE 16

| | |
|---|---|
| L-55 (1) | 55.94% |
| INCO Type 255 Nickel | 27.93% |
| Water | 12.86% |
| Xama-7 | 3.29% |

(1) 30% aqueous solution of a urethane resin, available from Spencer Kellogg.

The formulations of Examples 3 to 16 were sprayed onto foam Noryl FN-215 to give a dry film thickness of approximately 1 mil. Surface resistivity and adhesion were both measured and the coated panels were then aged in a humidity cabinet at 140° C., 95% relative humidity for 13 days. The results are given in Table I below along with results obtained for two standard materials, Emilux 1832 and Emilux 1904, which were used as 2 mil films on FN-215.

TABLE I

| | Surface Resistivity | | |
|---|---|---|---|
| Example | Initial | After 13 Days 140° F. 95% RH | Adhesion |
| 3 | .6 | 2.9 | 3B |
| 4 | .9 | 4.1 | 2B |
| 5 | 1.4 | 100 | 0B |
| 6 | 1.9 | 30 | 4B |
| 7 | .7 | 6.7 | B |
| 8 | .7 | 20 | 4B |
| 9 | .8 | 1.3 | 2B |
| 10 | 3.5 | 5.0 | B |
| 11 | 0.5 | 4.0 | B |

TABLE I-continued

| | Surface Resistivity | | |
|---|---|---|---|
| Example | Initial | After 13 Days 140° F. 95% RH | Adhesion |
| 12 | 0.7 | 2.8 | 4B |
| 13 | 0.9 | 2.7 | B |
| 14 | 1.5 | 2.5 | 4B |
| 15 | 1.2 | 2.8 | B |
| 16 | 1.5 | 3.4 | 2B |
| Emilux 1832 | 0.8 | >10000 | |
| Emilux 1904 | 0.4 | >10000 | |

NMP has also been found to be useful to improve the adhesion of these coating formulations on various plastic substrates.

EXAMPLE 17

| | |
|---|---|
| R-963 | 54.27% |
| INCO Type 255 Nickel | 31.01% |
| Water | 6.64% |
| Xama-7 | 3.65% |
| NMP | 4.43% |

EXAMPLE 18

| | |
|---|---|
| R-960 | 52.96% |
| INCO Type 255 Nickel | 29.08% |
| Water | 10.38% |
| Xama-7 | 3.43% |
| NMP | 4.15% |

EXAMPLE 19

| | |
|---|---|
| L-55 | 35.68% |
| INCO Type 255 Nickel | 27.00% |
| Water | 30.57% |
| Xama-7 | 2.89% |
| NMP | 3.86% |

Adhesion was then checked on several plastic substrates and the results are given in Table II.

TABLE II

| Substrate | | Ex 9 | Ex 18 | Ex 12 | Ex 17 | Ex 16 | Ex 19 |
|---|---|---|---|---|---|---|---|
| Noryl N-190 | (1) | | 0B | | 5B | | 2B |
| Noryl FN-215 | (1) | 2B | 2B | 4B | 5B | 2B | 5B |
| Lexan FL-900 | (1) | | 5B | | 5B | | 5B |
| Styron 6087SF | (2) | | 5B | | 5B | | 5B |
| Cycolac KJB | (3) | | 5B | | 5B | | 5B |
| Cycolac KJW | (3) | | 5B | | 5B | | 5B |

(1) General Electric Company
(2) Dow Chemical
(3) Borg-Warner

Obviously, other modifications and variations of the present invention are possible in the light of the above teachings. It is, therefore, to be understood that changes may be made in the particular embodiment of the invention described which are within the full intended scope of the invention as defined by the appended claims.

What is claimed is:

1. A method of making a water-based electromagnetic wave attenuating composition comprising the steps of:
    (a) providing an aqueous dispersion of a carboxylated acrylic or an aliphatic urethane resin;
    (b) adding an aqueous dispersion of an anionic surfactant or a trifunctional aziridine compound slowly to the aqueous dispersion of item (a) above; and (c) adding nickel powder to the mixed mixture of item (b) above and blending such powder into the mixed mixture under low shear conditions, wherein the nickel powder has a chain-like structure and has an average particle size of from about 2.2 to about 2.8 microus, an apparent density of from about 0.5 to about 0.65 g/cc and a specific surface area of about 0.68 m2/g.

2. The method of claim 1 wherein the aqueous dispersion of item (a) is from about 20 to about 40 parts by weight of a reaction product of diisocyanate of the formula OCN—R—NCO with a polyol or water wherein R is $(CH_2)_n$ and n is an integer of from 1 to about 8.

3. The method of claim 2 wherein a trifunctional aziridine is used in a concentration of from about 0.5 to about 5 parts by weight of said wave attenuating composition.

4. The method of claim 2 wherein from about 10 to about 20 parts by weight of said attenuating composition is a 20 to 50% solids aqueous dispersion of a surfactant.

5. The method of claim 3 wherein from about 10 to about 20 parts by weight of said attenuating composition is a 20 to 50% solids aqueous dispersion of a surfactant.

6. The method of claim 1 wherein the aqueous dispersion is from about 20 to about 40% resin and the aqueous dispersion is from about 40 to about 80 parts by weight of said attenuating composition and said nickel powder is from about 60 to about 20 parts by weight of said composition.

7. The method of claim 1 wherein both the surfactant and the trifunctional aziridine compound are used.

8. An aqueous composition for forming an electromagnetic wave barrier on a plastic surface comprising:
(a) from about 40 to about 80 parts by weight of an about 20 to about 40% by weight aqueous dispersion of a carboxylated acrylic or aliphatic urethane resin;
(b) from about 60 to about 20 parts by weight of a nickel powder having a chain-like structure and having an average particle size of from about 2.2 to about 2.8 microns, an apparent density of from about 0.5 to about 0.65 g./cc and a specific surface area of about 0.68 m2/g; and
(c) from about 0.5 to about 5 parts by weight of a trifunctional aziridine or from about 10 to about 20 parts by weight of aqueous dispersion of from about 20 to about 50% of an anionic surfactant.

9. The composition of claim 8 where both the aziridine compound and the surfactant are present.

10. The composition of claim 8 wherein the nickel powder has been dispersed in the composition under low shear conditions.

11. The composition of claim 8 wherein an aliphatic urethane resin is present which is the reaction product of a diisocyanate of the formula OCN—R—NCO, wherein R is $(CH_2)_n$ and n is an integer of from 1 to about 8.

12. A plastic substrate that has been coated with the cured composition of claim 8.

* * * * *